(12) United States Patent
Janson et al.

(10) Patent No.: US 9,809,105 B1
(45) Date of Patent: Nov. 7, 2017

(54) HYBRID TRANSAXLE

(71) Applicant: Ford Global Technologies, LLC, Dearborn, MI (US)

(72) Inventors: David Allen Janson, Plymouth, MI (US); David Gon Oh, Ann Arbor, MI (US); Gregory Daniel Goleski, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/350,417

(22) Filed: Nov. 14, 2016

(51) Int. Cl.
*B60K 6/445* (2007.10)
*F16H 37/08* (2006.01)
*F16H 3/72* (2006.01)
*F16H 7/06* (2006.01)
*F16H 48/08* (2006.01)
*B60K 6/365* (2007.10)

(52) U.S. Cl.
CPC .............. *B60K 6/445* (2013.01); *B60K 6/365* (2013.01); *F16H 3/727* (2013.01); *F16H 7/06* (2013.01); *F16H 37/0806* (2013.01); *F16H 37/0833* (2013.01); *F16H 48/08* (2013.01); *B60Y 2200/92* (2013.01); *B60Y 2400/73* (2013.01); *B60Y 2400/80* (2013.01); *Y10S 903/91* (2013.01)

(58) Field of Classification Search
CPC ..... B60K 6/365; B60K 6/445; F16H 37/0806; F16H 37/0833; F16H 3/727
See application file for complete search history.

(56) References Cited

U.S. PATENT DOCUMENTS

| 6,155,364 | A | 12/2000 | Nagano et al. |
| 7,455,135 | B2 | 11/2008 | Janson et al. |
| 8,491,432 | B2 | 7/2013 | Radermacher et al. |
| 2002/0094898 | A1* | 7/2002 | Hata ........................ B60K 6/40 475/5 |

FOREIGN PATENT DOCUMENTS

WO 2015097510 A1 7/2015

* cited by examiner

*Primary Examiner* — Huan Le
(74) *Attorney, Agent, or Firm* — David B. Kelley; Brooks Kushman P.C.

(57) ABSTRACT

A power-split hybrid transaxle uses a chain-only final drive. In addition to transferring power from the primary axis to the differential axis, the chain provides about a 2.5:1 torque multiplication. Eliminating the planetary final drive gear set traditionally associated with a chain axis transfer reduces that axial length of the transaxle and provides more space for a power take-off unit.

15 Claims, 2 Drawing Sheets

HYBRID TRANSAXLE

TECHNICAL FIELD

This disclosure relates to the field of vehicle transmissions. More particularly, the disclosure pertains to an arrangement of components in a hybrid transaxle.

BACKGROUND

Hybrid powertrains include energy storage devices such as batteries which are utilized to reduce fuel consumption by capturing braking energy and by permitting more efficient use of an internal combustion engine. The engine may be shut off while the vehicle is stationary. Also, the engine may be operated at higher power setting at which it is typically more efficient and then shut off a portion of the time that the vehicle is moving.

One type of hybrid powertrain is an electric power-split hybrid. At low speed, a planetary gear set divides the mechanical power generated by the internal combustion engine into two power flow paths. A portion of the power is conveyed to the drive wheels by gears, chains, or other mechanical power transfer components. The remaining power is directed to an electric machine and converted into electrical power. This electric machine is typically referred to as a generator although it may also be capable converting electrical power into mechanical power. A second electric machine drives the drive wheels. This second machine is typically referred to as a traction motor although it may be capable of converting mechanical power into electrical power. In some operating modes, all electrical power from the generator flows to the traction motor. In other operating modes, some electrical power may be diverted to a battery. In yet other operating modes, the battery may supplement the electrical power.

In a front wheel drive hybrid transaxle, the engine crankshaft rotates about an axis that is offset from and substantially parallel to an axle axis. The transaxle includes a differential on the axle axis which divides the power between left and right half-shafts that may rotate at slightly different speeds as the vehicle turns a corner. The space available for the transaxle is restricted by the size of the engine compartment and the space occupied by the engine.

SUMMARY OF THE DISCLOSURE

A hybrid transaxle includes a planetary gear set, first and second sprockets, a chain, and a differential. The planetary gear set includes a sun gear driveably connected to a first motor, a carrier driveably connected to an input shaft, and a ring gear driveably connected to a second motor and fixedly coupled to a first sprocket. The ring gear may be driveably connected to the second motor by a second planetary gear set having a second sun gear fixedly coupled to the second motor, a second carrier fixedly coupled to the ring gear, and a second ring gear fixedly held against rotation. The second sprocket is supported for rotation about a differential axis. The chain engages the first and second sprockets. A carrier of the differential is fixedly coupled to the second sprocket. The differential may be a bevel gear differential having left and right beveled side gears coupled to left and right half shafts and meshing with beveled planet gears supported for rotation with respect to the differential carrier.

In another embodiment, a hybrid transaxle includes a planetary gear set, first and second sprockets, a chain, and a differential. One element of the planetary gear set, such as a sun gear, is fixedly coupled to a first motor. A second element of the planetary gear set, such as a carrier, is fixedly coupled to an input shaft. A third element of the planetary gear set, such as a ring gear, is fixedly coupled to a first sprocket. The ring gear may be driveably connected to the second motor by a second planetary gear set having a second sun gear fixedly coupled to the second motor, a second carrier fixedly coupled to the ring gear, and a second ring gear fixedly held against rotation. The differential is axially aligned with the first planetary gear set and fixedly coupled to the second sprocket. The chain engages the first and second sprockets. The differential may be a bevel gear differential having left and right beveled side gears coupled to left and right half shafts and meshing with beveled planet gears supported for rotation with respect to the differential carrier.

In yet another embodiment, a hybrid transaxle includes a first planetary gear set, first and second sprockets, a chain, and a differential. The first planetary gear set includes a first sun gear fixedly couple to a first motor, a first carrier fixedly coupled to an input shaft, and a first ring gear fixedly coupled to the first sprocket. A differential carrier is fixedly coupled to the second sprocket. The differential carrier may be axially aligned with the first planetary gear set. The differential may be a bevel gear differential having left and right beveled side gears coupled to left and right half shafts and meshing with beveled planet gears supported for rotation with respect to the differential carrier. The chain engages the first and second sprockets. A second planetary gear set may include a second sun gear fixedly coupled to a second motor, a second carrier fixedly coupled to the first sprocket, and a second ring gear fixedly held against rotation.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotatable elements are fixedly coupled to one another if they are constrained to have the same rotational speed about the same axis in all operating conditions. Rotatable elements can be fixedly coupled by, for example, spline connections, welding, press fitting, or machining from a common solid. Slight variations in rotational displacement between fixedly coupled elements can occur such as displacement due to lash or shaft compliance. In contrast, two or more rotatable elements are selectively coupled by a shift element when the shift element constrains them to have the same rotational speed about the same axis whenever it is fully engaged and they are free to have distinct speeds in at least some other operating condition. Two rotatable elements are driveably connected if they are connected by a fixed power flow path that constrains their rotation speeds to be proportional with a predetermined speed ratio.

Figure 1:
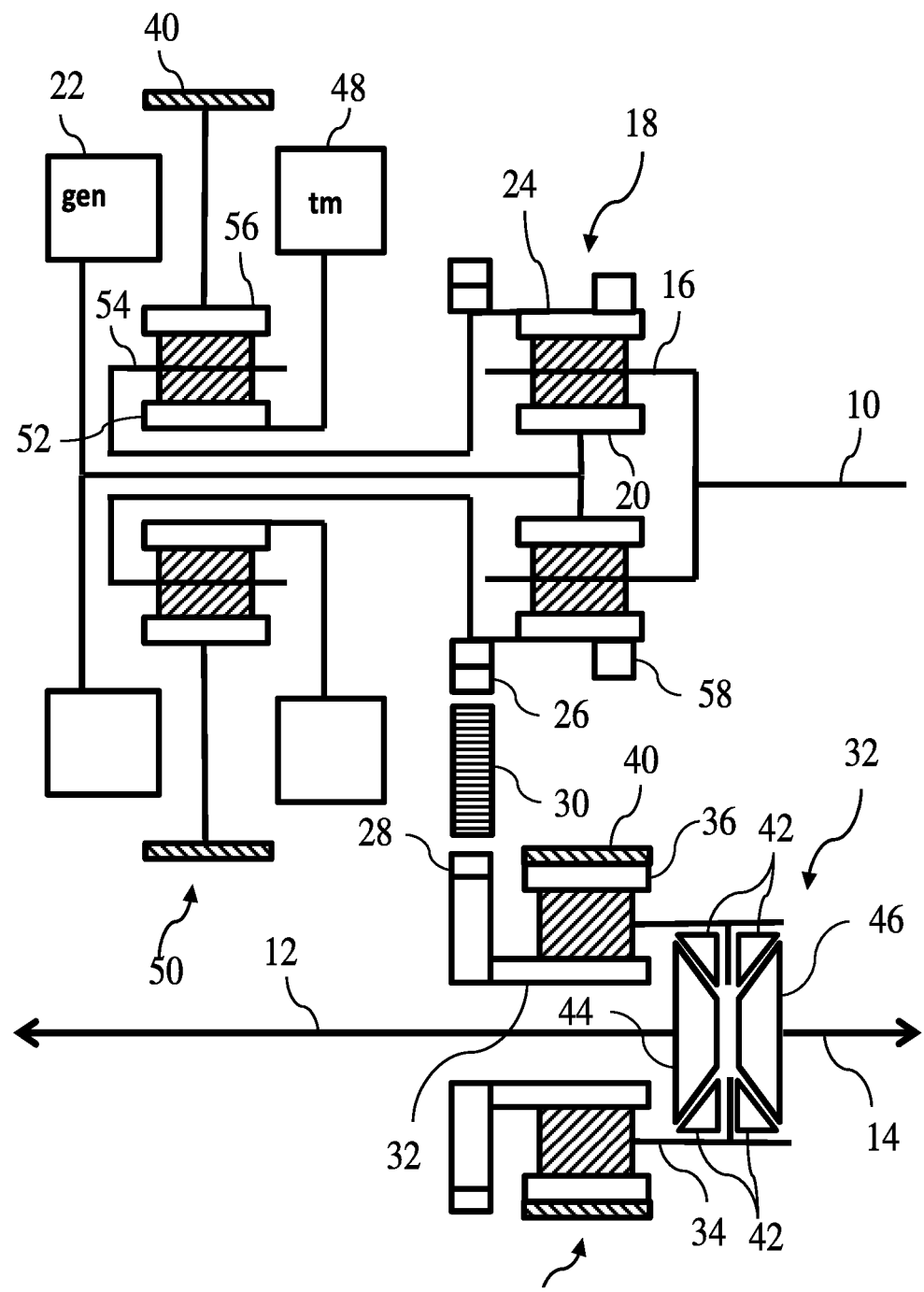
FIG. 1 is a schematic diagram of a power-split hybrid transaxle having a chain and planetary final drive.

FIG. 1 is a schematic illustration of a first hybrid transaxle. Power is received mechanically from an internal combustion engine via input shaft 10. Power is conveyed to left and right front vehicle wheels via half-shafts 12 and 14. Input shaft 10 is fixedly connected to the carrier 16 of the power split planetary gear set 18, which is axially located near the front of the transaxle. The sun gear 20 of the power split planetary gear set is fixedly coupled to the rotor of generator 22, which is located at the back of the transaxle. The ring gear 24 of the power split planetary gear set is fixedly coupled to a first sprocket 26. A second sprocket 28 is supported for rotation about the differential axis and is fixedly driveably connected to the first sprocket 26 by a chain 30. The second sprocket 28 is driveably connected to a differential 32 by a final drive planetary gear set 34.

The sun gear 34 of the final drive planetary gear set is fixedly coupled to second sprocket 28. The carrier 36 of the final drive planetary gear set is fixedly coupled to the input of differential 32. The ring gear 38 of the final drive planetary gear set is fixedly coupled to the transmission housing 40. Within differential 32, a set of bevel planet gears 42 are supported for rotation with respect to the differential input, which may be called a differential carrier. The planet gears mesh with bevel side gears 44 and 46 which are fixedly coupled to half shafts 12 and 14 respectively.

Traction motor 48 is fixedly driveably connected to first sprocket 26 via a torque multiplication planetary gear set 50. The sun gear 52 of the torque multiplication planetary gear set is fixedly coupled to traction motor 48. The carrier 54 of the torque multiplication planetary gear set is fixedly coupled to the first sprocket 26. The ring gear 56 of the torque multiplication planetary gear set is fixedly coupled to the transmission housing 40.

Placing sprocket 26 and the power split planetary gear set 18 near the front of the transmission (near the engine) provides several advantages. First, there are no components on the differential axis opposite generator 22 and traction motor 48. This permits use of large diameter electric machines. For a given torque and power capacity, a larger diameter electrical machine tends to have a shorter axial length. Minimizing the axial length of the electrical machines minimized the overall axial length of the transaxle. Second, the power split planetary gear set 18 is opposite the final drive planetary gear set 34, such that it does not impacts the total axial length of the transaxle. The axial length to the front side of the sprocket and chain (right side in FIG. 1) is determined by the widths of final drive planetary gear set 34 and differential 32.

In the transmission of FIG. 1, each planetary ring gear has approximately twice as many teeth as the respective sun gear. The ratio of ring gear teeth to sun gear teeth is called the beta ratio of the planetary gear set. These planetary gear sets multiply the torque provided by the engine and the traction motor. If power split gear set 18 has a beta ratio of 2, then 2/3 of the torque provided by the engine is transmitted to sprocket 26 by ring gear 24. If torque multiplication gear set 50 has a beta ratio of 2, the carrier 54 transmits 3 times the torque generated by traction motor 48 to sprocket 26. In the transmission of FIG. 1, Sprocket 26 and 28 have approximately the same number of teeth such that the sprocket and chain assembly contributes little to the torque multiplication. If the final drive planetary gear set 34 has a beta ratio of 2, it multiplies the torque delivered to sprocket 28 by a factor of 3 before transmitting the torque to differential 30. Overall, the engine torque is multiplied by a factor of 2 and the traction motor torque is multiplied by a factor of 9.

Park gear 58 is fixedly coupled to ring gear 24. A park mechanism (not shown) includes a parking pawl that selectively engages park gear 58 to hold the vehicle against motion.

Figure 2:
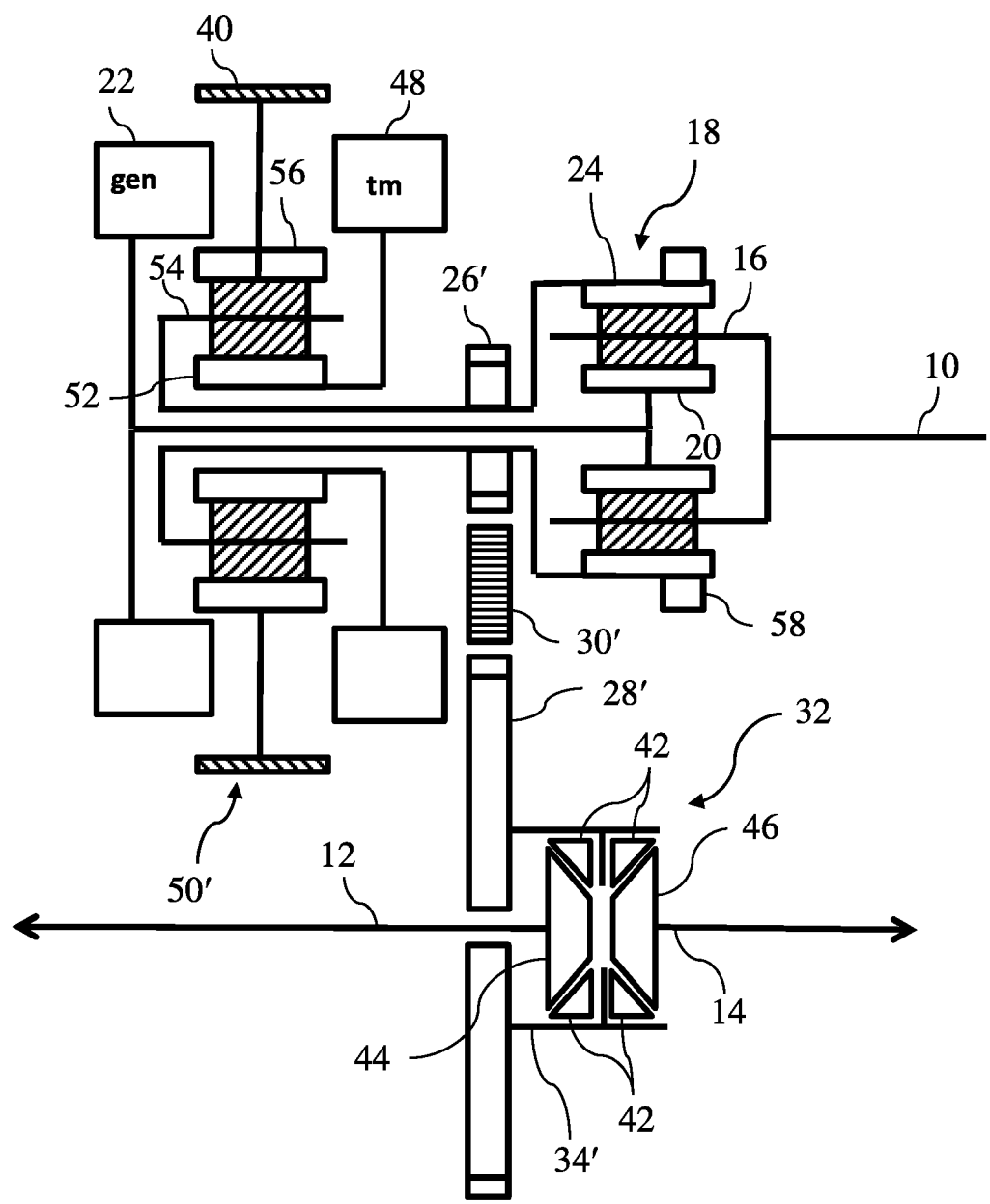
FIG. 2 is a schematic diagram of a power-split hybrid transaxle having a chain-only final drive.

FIG. 2 is a schematic illustration of a second hybrid transaxle. Power is received mechanically from an internal combustion engine via input shaft 10. Power is conveyed to left and right front vehicle wheels via half-shafts 12 and 14. Input shaft 10 is fixedly connected to the carrier 16 of the power split planetary gear set 18, which is axially located near the front of the transaxle. The sun gear 20 of the power split planetary gear set is fixedly coupled to the rotor of generator 22, which is located at the back of the transaxle. The ring gear 24 of the power split planetary gear set is fixedly coupled to a first sprocket 26'. A second sprocket 28' is supported for rotation about the differential axis and is fixedly driveably connected to the first sprocket 26' by a chain 30'. The second sprocket 28' is fixedly coupled to differential carrier 34'.

The transmission of FIG. 2 does not utilize a final drive planetary gear set between the driven sprocket 28' and the differential 32. Instead, sprocket 28' is approximately 2.5 times larger than sprocket 26' such that the chain and sprocket assembly provides substantial torque multiplication. The beta ratio of torque multiplication gear set 50' may be increased to make up the difference. If torque multiplication gear set 50' has a beta ratio of 3, then 10 times the torque of traction motor 48 is transmitted to differential 32. If power split gear set 18 has a beta ratio of 2, then 5/3 of the torque provided by the engine is transmitted to differential 32.

Eliminating final drive planetary gear set 34 reduces the axial length of the transaxle along the differential axis. This is particularly advantageous in small front wheel drive vehicles that tend to have very narrow engine compartments. This is also particularly advantageous in all wheel drive vehicles because more space is available for a power take-off unit to divert torque from differential 32 to the rear wheels.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A hybrid transaxle comprising:
   a planetary gearset having a sun gear driveably connected to a first motor, a carrier driveably connected to an input shaft, and a ring gear driveably connected to a second motor;
   a first sprocket fixedly coupled to the ring gear;
   a second sprocket supported for rotation about a differential axis;
   a chain engaging the first and second sprockets; and
   a differential having a differential carrier fixedly coupled to the second sprocket.

2. The hybrid transaxle of claim 1 wherein the differential further comprises:
   a left beveled side gear fixedly coupled to a left half-shaft;
   a right beveled side gear fixedly coupled to a right half-shaft; and
   a plurality of beveled planet gears supported for rotation with respect to the differential carrier and meshing with both the left and right beveled side gears.

3. The hybrid transaxle of claim 1 wherein the sun gear is fixedly coupled to the first motor.

4. The hybrid transaxle of claim 1 wherein the carrier is fixedly coupled to the input shaft.

5. The hybrid transaxle of claim 1 wherein the ring gear is driveably connected to the second motor via a second planetary gear set having a second sun gear fixedly coupled to the second motor, a second carrier fixedly coupled to the ring gear, and a second ring fixedly held against rotation.

6. A hybrid transaxle comprising:
   a first planetary gear set having three rotatable elements, a first of which is fixedly coupled to a first motor, a second of which is fixedly coupled to an input shaft, and a third of which is fixedly coupled to a first sprocket;
   a differential carrier radially offset from the first planetary gear set and fixedly coupled to a second sprocket; and
   a chain engaging the first and second sprockets.

7. The hybrid transaxle of claim 6 wherein the first of the three rotatable elements is a sun gear.

8. The hybrid transaxle of claim 6 wherein the second of the three rotatable elements is a carrier.

9. The hybrid transaxle of claim 6 wherein the third of the three rotatable elements is a ring gear.

10. The hybrid transaxle of claim 6 further comprising a second planetary gear set having a sun gear fixedly coupled to a second motor, a carrier fixedly coupled to the first sprocket, and a ring gear fixedly held against rotation.

11. The hybrid transaxle of claim 6 further comprising:
    a left beveled side gear fixedly coupled to a left half-shaft;
    a right beveled side gear fixedly coupled to a right half-shaft; and
    a plurality of beveled planet gears supported for rotation with respect to the differential carrier and meshing with both the left and right beveled side gears.

12. A hybrid transaxle comprising:
    a first planetary gear set having a first sun gear fixedly coupled to a first motor, a first carrier fixedly coupled to an input shaft, and a first ring gear fixedly coupled to a first sprocket;
    a differential carrier fixedly coupled to a second sprocket; and
    a chain engaging the first and second sprockets.

13. The hybrid transaxle of claim 12 wherein the differential carrier is radially offset from the first planetary gear set.

14. The hybrid transaxle of claim 12 further comprising a second planetary gear set having a second sun gear fixedly coupled to a second motor, a second carrier fixedly coupled to the first sprocket, and a second ring gear fixedly held against rotation.

15. The hybrid transaxle of claim 12 further comprising:
    a left beveled side gear fixedly coupled to a left half-shaft;
    a right beveled side gear fixedly coupled to a right half-shaft; and
    a plurality of beveled planet gears supported for rotation with respect to the differential carrier and meshing with both the left and right beveled side gears.

* * * * *